United States Patent
Lee et al.

(10) Patent No.: US 11,820,205 B2
(45) Date of Patent: Nov. 21, 2023

(54) SLIM AIR VENT FOR VEHICLE

(71) Applicants: Hyundai Motor Company, Seoul (KR); Kia Corporation, Seoul (KR); ITW EF&C Korea LLC., Incheon (KR)

(72) Inventors: Yong Woo Lee, Yongin-si (KR); Chun Ha Kim, Seoul (KR); Byung Jo Kim, Incheon (KR)

(73) Assignees: HYUNDAI MOTOR COMPANY, Seoul (KR); KIA CORPORATION, Seoul (KR); ITW EF&C KOREA LLC., Incheon (KR)

( * ) Notice: Subject to any disclaimer, the term of this patent is extended or adjusted under 35 U.S.C. 154(b) by 0 days.

(21) Appl. No.: 17/490,030

(22) Filed: Sep. 30, 2021

(65) Prior Publication Data
US 2022/0314747 A1     Oct. 6, 2022

(30) Foreign Application Priority Data

Apr. 1, 2021  (KR) .......................... 10-2021-0042799

(51) Int. Cl.
    *B60H 1/34*     (2006.01)
(52) U.S. Cl.
    CPC ... *B60H 1/3421* (2013.01); *B60H 2001/3471* (2013.01)
(58) Field of Classification Search
    CPC ........ B60H 1/00871; B60H 1/34–3421; B60H 2001/3464; B60H 2001/3471
    See application file for complete search history.

(56) References Cited

U.S. PATENT DOCUMENTS

| | | | |
|---|---|---|---|
| 2006/0223430 A1* | 10/2006 | Shibata | F24F 13/075 454/155 |
| 2014/0308889 A1 | 10/2014 | Oe et al. | |
| 2018/0215238 A1 | 8/2018 | Lee et al. | |
| 2019/0092138 A1* | 3/2019 | Lee | B60H 1/247 |
| 2019/0366808 A1 | 12/2019 | Kang | |

FOREIGN PATENT DOCUMENTS

| | | | |
|---|---|---|---|
| DE | 102016122142 A1 * | 5/2018 | ........... B60H 1/3421 |
| DE | 102016122142 A1 | 5/2018 | |
| EP | 3 027 443 A1 | 6/2016 | |

(Continued)

OTHER PUBLICATIONS

Extended European Search Report dated Jan. 14, 2022 in regard to the corresponding, issued in corresponding European Patent Application No. 21201884.0.

*Primary Examiner* — Edelmira Bosques
*Assistant Examiner* — Michael James Giordano
(74) *Attorney, Agent, or Firm* — Morgan, Lewis & Bockius LLP

(57) ABSTRACT

A slim air vent apparatus for a vehicle may include an internal wing, an external wing, and a support wing that are disposed and hidden inside a duct to realize a compact and slim air vent apparatus and to improve the appearance by hiding the components. Since the air vent is operated to fulfil the functions thereof by manual manipulation of a single knob, positioned at the center portion of the external wing, by a user, it is possible to improve the convenience in manipulation of a user and to reduce manufacturing costs, and the air vent is universally applicable to various kinds of vehicles.

13 Claims, 6 Drawing Sheets

(56) References Cited

FOREIGN PATENT DOCUMENTS

| | | | |
|---|---|---|---|
| EP | 3 412 483 A1 | | 12/2018 |
| JP | 5922671 B2 | | 5/2016 |
| KR | 20080036883 A | * | 4/2008 |
| KR | 20100072810 A | * | 7/2010 |
| KR | 10-1655413 B1 | | 9/2016 |
| KR | 10-2018-0065398 A | | 6/2018 |
| KR | 20180065398 A | * | 6/2018 |
| KR | 10-2018-0089768 A | | 8/2018 |
| KR | 10-2001162 B1 | | 7/2019 |
| KR | 10-2019-0138487 A | | 12/2019 |

* cited by examiner

SLIM AIR VENT FOR VEHICLE

CROSS-REFERENCE TO RELATED APPLICATION

The present application claims priority to Korean Patent Application No. 10-2021-0042799, filed on Apr. 1, 2021, in the Korean Intellectual Property Office, the entire contents of which is incorporated herein for all purposes by this reference.

BACKGROUND OF THE INVENTION

Field of the Invention

The present invention relates to a slim air vent apparatus for a vehicle, and more particularly to a slim air vent apparatus for a vehicle, which is constructed to have a reduced vertical height while satisfying performance requirements related to the wind direction, the amount of airflow, and the like.

Description of Related Art

In general, a dashboard of a vehicle is provided with an air vent configured to allow cool or warm air to be discharged to the passenger compartment thereof.

The air vent includes an internal wing, configured to be rotated horizontally, and an external wing, configured to be rotated vertically such that air which is cooled or warmed by an air conditioner is discharged to the passenger compartment in vertical and horizontal directions by the rotation of the internal wing and the external wing.

The conventional air vent is generally constructed such that a plurality of external wings, which are disposed vertically to be spaced from each other and are rotatable vertically, project outwards from a duct, through which airflows. When viewed from the interior of the vehicle, the conventional air vent has an increased vertical length (an increased vertical height) and a horizontal length equal to the vertical length because a plurality of external wings, which are disposed vertically, project outwards from the duct. Hence, because the conventional air vent has an external size and an unattractive appearance, there is a disadvantage of making it difficult to realize a smart and luxurious appearance.

Furthermore, because the conventional air vent is constructed such that the external wings project outwards from the duct and are exposed to the passenger compartment, there is a disadvantage in that a poor appearance results.

Furthermore, because the conventional air vent is constructed such that the cross-sectional area of an outlet, through which air is discharged to the passenger compartment, is varied by vertical rotation of the external wings and thus the amount of air which is discharged to the passenger compartment varies, there are disadvantages in that it is impossible to maintain the amount of discharged air constant and thus the performance of the air vent deteriorates.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a slim air vent apparatus for a vehicle in which all of internal wings, external wings and support wings, which are rotated to control the direction of airflow while satisfying performance requirements related to the direction of airflow, the amount of airflow, and the like, are disposed inside a duct to reduce the vertical height thereof, realizing a compact and slim air vent apparatus having a smart and luxurious appearance.

Various aspects of the present invention are directed to providing a slim air vent apparatus for a vehicle which is constructed such that internal wings, external wings and support wings are disposed in a duct to prevent the external wings from projecting outwards from the duct and to improve the appearance thereof.

It is a further object of the present invention to provide a slim air vent apparatus for a vehicle which is constructed such that the cross-sectional area of an outlet, through which air is discharged to a passenger compartment, is maintained constant regardless of the rotation direction of the external wings, so that the amount of air discharged to a passenger compartment therethrough is maintained constant and the performance of the air vent is improved.

In accordance with various aspects of the present invention, the above and other objects can be accomplished by the provision of a slim air vent apparatus for a vehicle including spacers fixedly coupled to first and second lateral sides of a duct, an internal wing disposed in the duct, an external wing, which is positioned behind the internal wing, wherein first and second lateral end portions of the external wing are rotatably coupled to the spacers to be rotated vertically, a support wing, which is rotatably coupled to a front end portion of the external wing and is vertically rotatably coupled at first and second lateral end portions thereof to the spacers to be changed in length when the external wing is rotated, and a knob coupling the internal wing to the external wing, wherein all of the internal wing, the external wing and the support wing are positioned inside the duct.

The external wing may include an upper external wing and a lower external wing, which are vertically spaced from each other, wherein one of the upper external wing and the lower external wing may include guide protrusions formed at two lateral sides thereof, and the spacers may have formed therein guide slots, which extend along the rotational radius of the external wing and the guide protrusion is movable engaged in the guide slot.

The external wing may include an upper external wing and a lower external wing, which are vertically spaced from each other and are pivotally connected to each other via a connecting rod to be rotated together.

Each of first and second lateral sides of a rear end portion of the upper external wing and first and second lateral sides of a rear end portion of the lower external wing may be provided with a hinge protrusion, the hinge protrusions being fitted into hinge holes formed in the spacers so that the upper external wing and the lower external wing are vertically rotated relative to the spacers.

The support wing may include an upper support wing, which is rotatably connected to a front end portion of the upper external wing and which is provided at first and second lateral sides of a front portion thereof with hinge protrusions, which are fitted into hinge holes formed in the spacers so that the upper support wing is vertically rotated relative to the spacers, and a lower support wing, which is rotatably connected to a front end portion of the lower external wing and which is provided at first and second lateral sides of a front portion thereof with hinge protrusions, which are fitted into hinge holes formed in the spacers so that the lower support wing is vertically rotated relative to the spacers.

Air that has passed through the internal wing in the duct may be discharged to a passenger compartment through a front flow path defined between the upper support wing and the lower support wing and through a rear flow path defined between the upper external wing and the lower external wing.

When the knob is oriented horizontally, the upper external wing and the upper support wing, which are disposed above the knob, may be positioned to be symmetrical to the lower external wing and the lower support wing, which are disposed below the knob.

When the knob is oriented horizontally, the cross-sectional area between the upper support wing and the lower support wing may decrease moving toward rear end portions thereof from front end portions thereof so that the front flow path is configured as a nozzle.

The cross-sectional area of the rear flow path may be maintained at a certain magnitude regardless of rotational the direction of the upper external wing and the lower external wing.

Air that has passed through the front flow path may be discharged upwards through the rear flow path when the external wing is rotated upwards, and may be discharged downwards through the rear flow path when the external wing is rotated downwards.

Each of the upper support wing and the lower support wing may include a cylinder and a cylinder rod, which is movably fitted into the cylinder such that the lengths of the upper support wing and the lower support wing vary independently when the external wing is rotated vertically.

The knob may include a lug, which is configured to be manipulated by a user, a first coupler coupled to the internal wing, and a second coupler coupled to the external wing, and only a portion of the lug may project outwards from the duct to be exposed to the passenger compartment.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
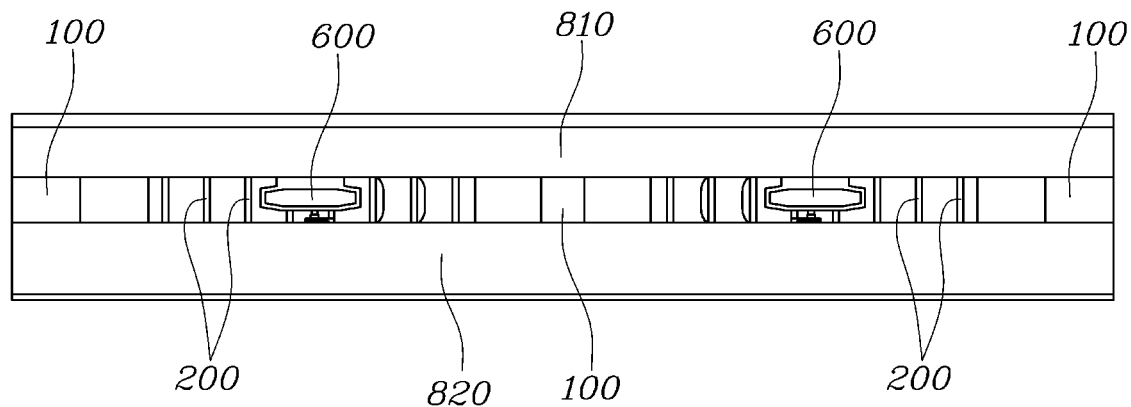
FIG. 1 is a front view of a slim air vent apparatus according to various exemplary embodiments of the present invention.
Figure 2:
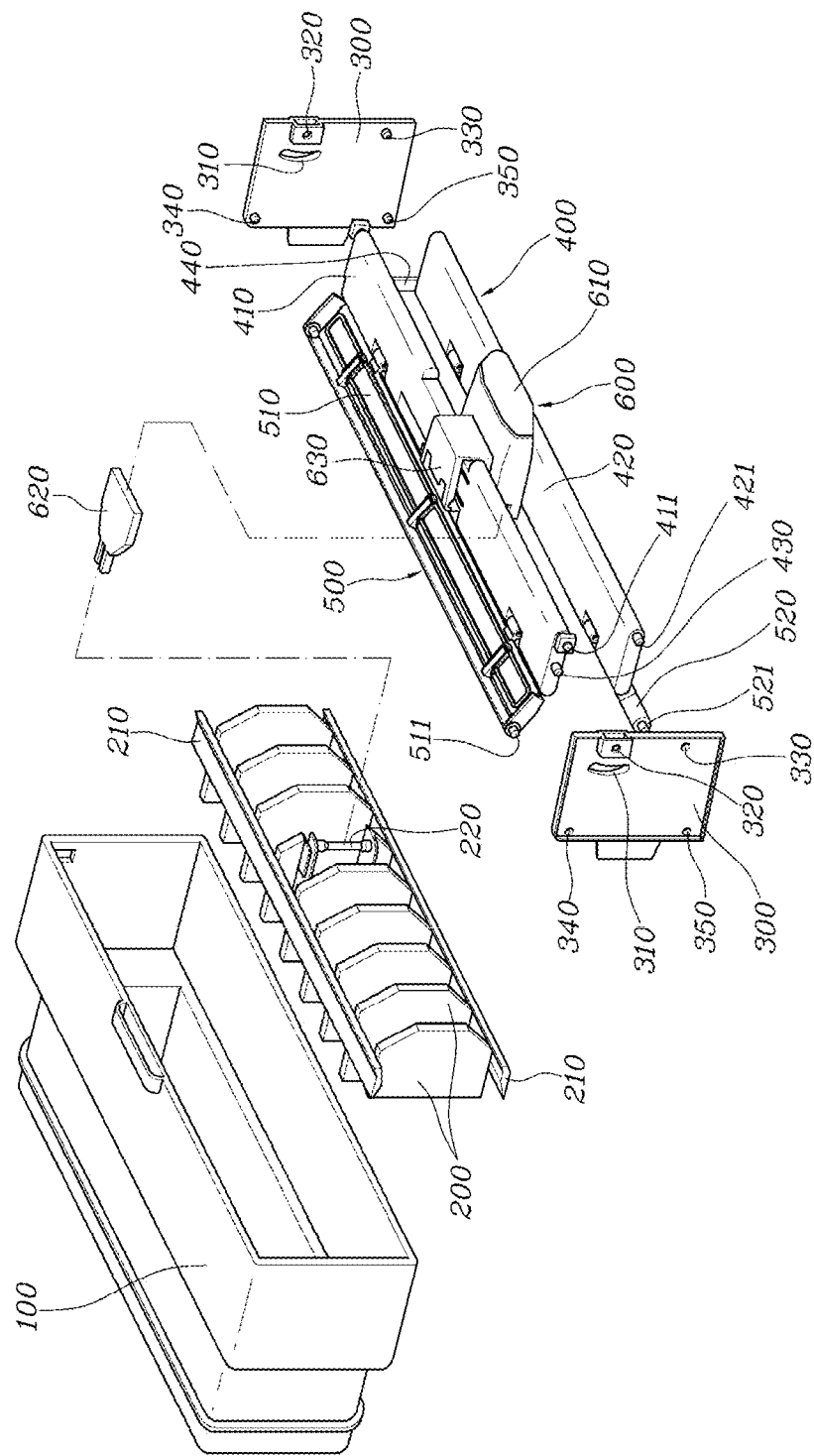
FIG. 2 is an exploded perspective view of the slim air vent apparatus according to the exemplary embodiment of the present invention.
Figure 3:
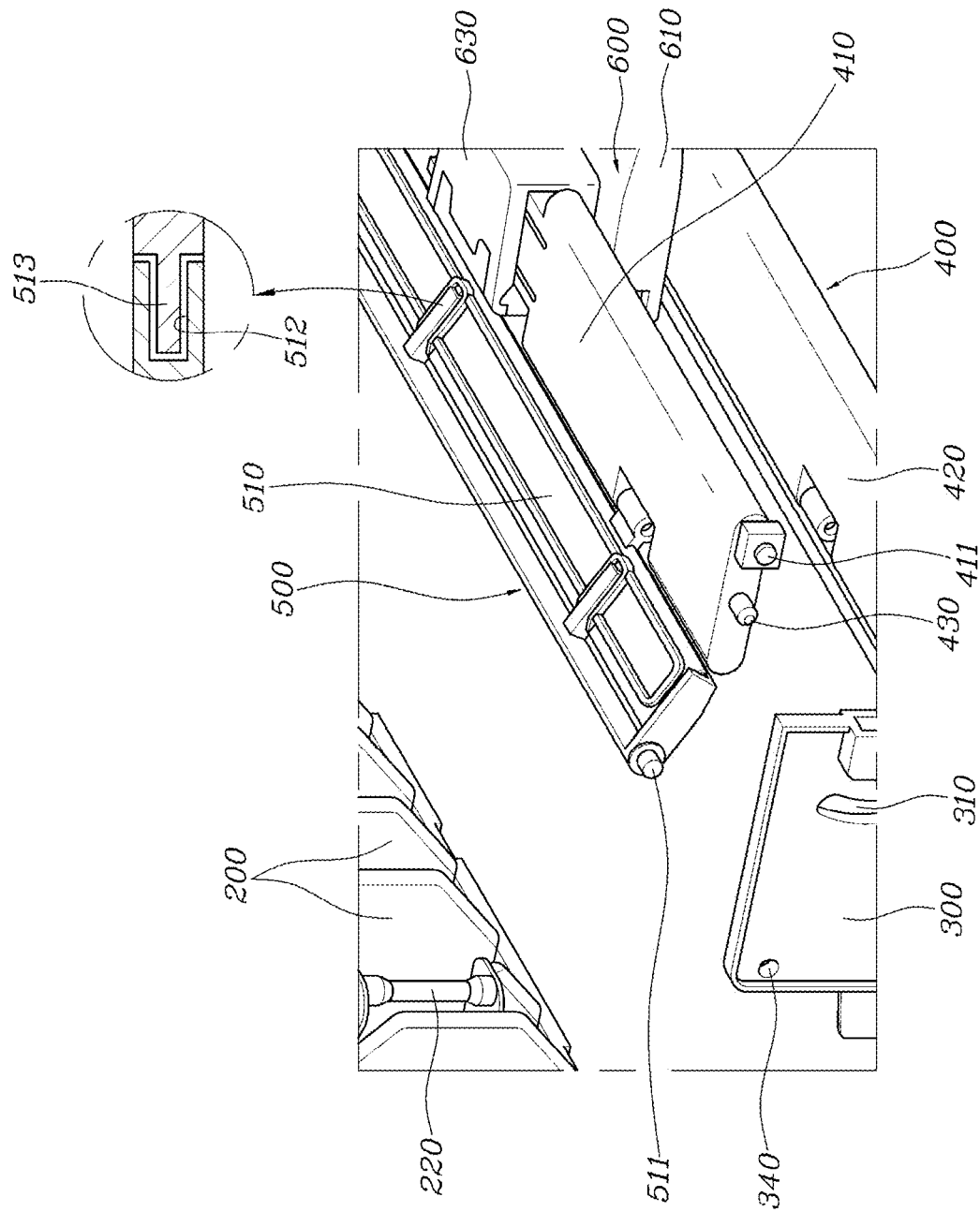
FIG. 3 is an enlarged view of the coupled portion between an upper external wing and an upper support wing.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Specific structural and functional descriptions of embodiments of the present invention included herein are provided only for illustration of the embodiments of the present invention. The present invention may be embodied in many different forms without departing from the spirit and significant characteristics of the present invention. Therefore, the embodiments of the present invention are disclosed only for illustrative purposes, and should not be construed as limiting the present invention.

Reference will now be made in detail to various embodiments of the present invention, specific examples of which are illustrated in the accompanying drawings and described below, since the embodiments of the present invention may be variously modified in various forms. While the present invention will be described in conjunction with exemplary embodiments thereof, it is to be understood that the present description is not intended to limit the present invention to those exemplary embodiments. On the other hand, the present invention is directed to cover not only the exemplary embodiments of the present invention, but also various alternatives, modifications, equivalents and other embodiments which may be included within the spirit and scope of the present invention as defined by the appended claims.

It will be understood that, although the terms "first," "second," etc. may be used herein to describe various elements, these elements may not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it can be directly coupled or connected to the other element, or intervening elements may be present therebetween. In contrast, it should be understood that when an element is referred to as being "directly coupled" or "directly connected" to another element, there are no intervening elements present. Other expressions that describe the relationship between elements, such as "between," "directly between," "adjacent to," or "directly adjacent to," should be understood in the same way.

The terminology used herein is for describing various exemplary embodiments only and is not intended to be limiting. As used herein, the singular forms "a," "an" and "the" are intended to include the plural forms as well, unless the context clearly indicates otherwise. It will be further understood that the terms "comprise", "include", "have", etc., when used in the exemplary embodiment, specify the presence of stated features, integers, steps, operations, elements, components, and/or combinations thereof, but do not preclude the presence or addition of one or more other features, integers, steps, operations, elements, components, and/or combinations thereof.

Unless otherwise defined, all terms including technical and scientific terms used herein have the same meanings as those commonly understood by one of ordinary skill in the art to which the present invention belongs. It will be further understood that terms, such as those defined in commonly used dictionaries, should be interpreted as having meanings consistent with their meanings in the context of the relevant art and the present invention, and are not to be interpreted in an idealized or overly formal sense unless expressly so defined herein.

The control unit (controller) according to various exemplary embodiments of the present invention may be embodied by nonvolatile memory, configured to store an algorithm configured to control the operation of various components of a vehicle or data relating to software instructions for executing the algorithm, and a processor configured to perform operations, which will be described below, using the data stored in the memory. Here, the memory and the processor may be embodied by separate chips. Alternatively, the memory and the processor may be embodied by a single chip in which the memory and the processor are integrated. The processor may be embodied as one or more processors.

Hereinafter, a slim air vent apparatus for a vehicle according to various exemplary embodiments of the present invention will be described with reference to the accompanying drawings.

As illustrated in FIGS. 1 to 6, the slim air vent apparatus for a vehicle according to the exemplary embodiment of the present invention includes a duct 100 configured to guide flowing air to the passenger compartment of the vehicle, a plurality of internal wings 200, which are coupled to the duct 100 to be rotated horizontally to thus guide the air to be discharged in a horizontal direction, spacers 300 fixedly coupled to the right and left sides of the duct 100, external wings 400, which are positioned behind the internal wings 200 and are coupled at the right and left end portions thereof to the spacers 300 to be rotated vertically, support wings 500, each of which is rotatably coupled to the front end portion of a corresponding one of the spacers 300 and the width of which is varied by a rotation of the corresponding external wing 400, and a knob 600 coupled to the internal wings 200 and the external wings 400 to connect the internal wings 200 to the external wings 400.

The slim air vent apparatus according to the exemplary embodiment of the present invention is constructed such that all of the internal wings 200, the external wings 400 and the support wings 500 are disposed in the duct 100. Accordingly, in comparison with a conventional air vent in which a plurality of vertically disposed external wings project outwards from a duct, it is possible to greatly reduce the vertical height of the air vent. Consequently, since it is possible to realize a slim air vent apparatus and a smart and luxurious appearance, there is an advantage of being capable of also being applied to an autonomous vehicle having a smart appearance.

Furthermore, since all of the internal wings 200, the external wings 400, and the support wings 500 are positioned in the duct 100, there is an advantage of improving the appearance by the hidden wings.

The internal wings 200 include a plurality of internal wings, which are disposed horizontally, and the plurality of internal wings 200 are integrally connected by linkages 210, which are coupled to the upper and lower end portions of the internal wings 200. Consequently, when any one of the plurality of internal wings 200 is rotated in a horizontal direction thereof, the remaining internal wings, which are connected to the one internal wing 200 via the linkages 210, are simultaneously rotated.

Because the slim air vent apparatus according to the exemplary embodiment of the present invention, which is shown in FIG. 1, is constructed such that two ducts 100 are connected to each other in a horizontal direction, two knobs 600 are disposed horizontally.

The internal wings 200 and the external wings 400 may be respectively referred to as vertical wings and horizontal wings depending on the direction of orientation thereof.

According to the exemplary embodiment of the present invention, the spacers 200 are fixedly coupled to the right and left sides of the duct 100 to face the lateral sides of the external wings 400.

The spacers 300 also are configured to block the undesirable gaps between the lateral side surfaces of the duct 100 and the lateral side surfaces of the external wings 400 to thus prevent air leakage. As a result, it is possible to prevent a whistling noise caused by the air leakage.

The external wings 400 include an upper external wing 410 and a lower external wing 420, which are spaced from each other vertically.

One of the upper external wing 410 and the lower external wing 420 is provided on the lateral side surfaces thereof with respective guide protrusions 430, and the spacers 300 have formed therein guide slots 310, which extend along the rotational radius of the external wing 400 and in which the guide protrusions 430 are moved.

According to the exemplary embodiment of the present invention, the guide protrusions 430 are formed in the lateral side surfaces of the upper external wing 410, and the guide slots 310 in the spacers 300 are configured to extend along the rotational radius of the upper external wing 410.

If the guide protrusions 430 are formed on the lateral side surfaces of the lower external wing 420, the guide slots 310 in the spacers 300 are configured to extend along the rotational radius of the lower external wing 420.

The guide protrusions 430 and the guide slots 310 are configured to guide the vertical rotation of the external wing 400, and also are configured to connect the duct 100 to the external wing 400 via the spacers 300, more firmly coupling the external wing 400.

According to the exemplary embodiment of the present invention, the upper external wing 410 and the lower external wing 420 are pivotally connected to each other via a connecting rod 440 such that the upper external wing 410 and the lower external wing 420 are rotated together.

The two end portions of the connecting rod 440 are respectively, and rotatably coupled to the upper external wing 410 and the lower external wing 420 in a hinged manner.

The two lateral sides of the rear end portion of the upper external wing 410 are respectively provided with hinge protrusions 411, and the two lateral sides of the rear end portion of the lower external wing 420 are provided with respective hinge protrusions 421. Correspondingly, each of the spacers 300 has hinge holes 320 and 330, into which the hinge protrusions 411 and 421 are fitted. As a result, the upper external wing 410 and the lower external wing 420 are rotatable vertically with respect to the spacers 300 by the engagement of the hinge protrusions 411 and 421 with the hinge holes 320 and 330.

The support wings 500 include an upper support wing 510, which is rotatably connected to the front end portion of the upper external wing 410 and which has hinge protrusions 511 formed on the two lateral sides of the front end portion thereof, which are fitted into hinge holes 340 formed in the spacers 300 such that the upper support wing 510 is rotatable vertically with respect to the spacers 300, and a lower support wing 520, which is rotatably connected to the front end portion of the lower external wing 420 and which has hinge protrusions 521 formed on the two lateral sides of the front end portion thereof, which are fitted into hinge holes 350 formed in the spacers 300 such that the lower support wing 520 is rotatable vertically with respect to the spacers 300.

In brief, the internal wings 200 are disposed at the foremost position in the duct 100, and the upper support wing 510 and the lower support wing 520 are symmetrically disposed to be symmetrical to each other in a vertical direction at the rear end portions of the internal wings 200. The rear end portion of the upper support wing 510 is connected to the upper external wing 410, and the rear end portion of the lower support wing 520 is connected to the lower external wing 410. The upper external wing 410 and the lower external wing 420 are disposed to be symmetrical to each other in a vertical direction.

Consequently, the air that has passed through the internal wings 200 in the duct 100 is discharged to the passenger compartment through a front flow path 710 defined between the upper support wing 510 and the lower support wing 520 and a rear flow path 720 defined between the upper external wing 410 and the lower external wing 420.

The knob 600 includes a lug 610, which is manipulated by a user, a first coupler 620 coupled to the internal wings 200, and a second coupler 630 coupled to the external wings 400.

The second coupler 630 of the knob 600 is coupled to the rear end portion of the upper external wing 410 to be movable in a lateral direction overall, that is, in the longitudinal direction of the upper external wing 410, and the first coupler 620 of the knob 600 is coupled to a vertical rod 220 of the internal wings 200 to be movable in a vertical direction, that is, in the longitudinal direction of the vertical rod 220.

When the lug 610 of the knob 600 is laterally moved along the upper external wing 410 by a user, the vertical rod 220 is moved laterally by the first coupler 620, and thus the internal wings 200 are laterally rotated relative to the duct 100 by the linkages 210. At the instant time, the upper external wing 410 and the lower external wing 420 are maintained in place rather than being rotated vertically.

Meanwhile, when the lug 610 of the knob 600 is moved vertically by the user, the upper external wing 410 and the lower external wing 420 are rotated vertically together. At the instant time, the first coupler 620 of the knob 600 is moved vertically along the vertical rod 220, and thus the internal wings 200 are maintained in place, rather than being rotated laterally.

According to the exemplary embodiment of the present invention, since only a rear portion of the lug 610 of the knob 600 projects from the duct 100 outwards (rearwards or in a direction toward the passenger compartment), it is possible to contribute to improving the appearance by hiding the components.

Figure 4:
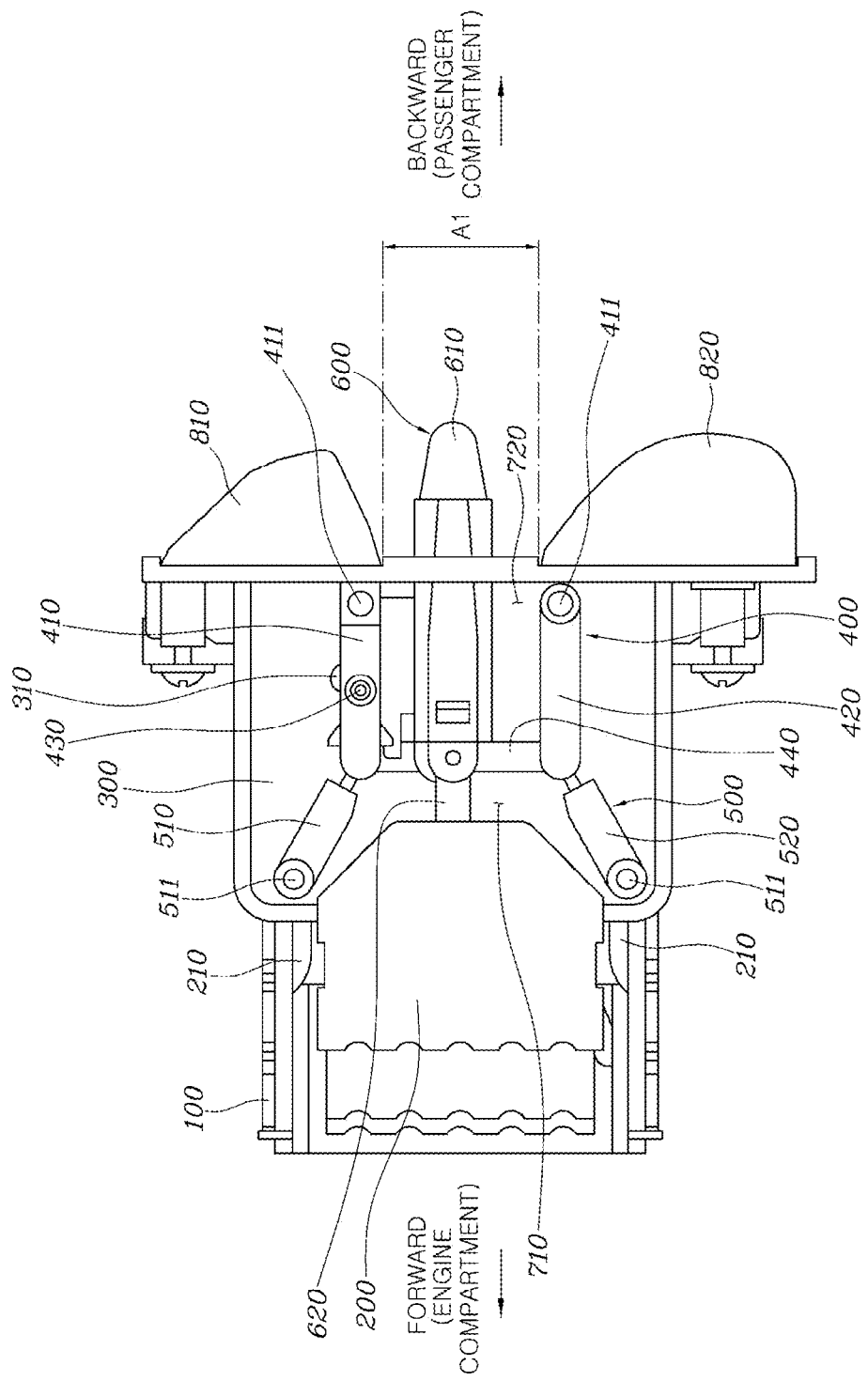
FIG. 4 is a side view of FIG. 1 in which a knob is positioned horizontally in an anteroposterior direction.

When the knob 600 is horizontally oriented in an anteroposterior direction, as illustrated in FIG. 4, the upper external wing 410 and the upper support wing 510, which are positioned above the knob 600, are vertically symmetrical to the lower external wing 420 and the lower support wing 520, which are positioned below the knob 600. As a result, it is possible to improve the directivity of the air which is discharged to the passenger compartment after passing through the internal wings 200 and through the front flow path 710 and the rear flow path 720.

When the knob 600 is horizontally oriented in an anteroposterior direction, as illustrated in FIG. 4, the air that has passed through the rear flow path 720 is discharged toward the front side of a passenger positioned in the passenger compartment.

Furthermore, when the knob 600 is horizontally oriented in an anteroposterior direction, as illustrated in FIG. 4, the cross-sectional area between the upper support wing 510 and the lower support wing 520 decreases moving toward the rear end portions from the front end portions of the support wings 510 and 520 such that the front flow path 710 defined between the upper support wing 510 and the lower support wing 520 is configured as a nozzle, conferring an advantage of accelerating the speed of the air discharged toward the passenger compartment.

Figure 5:
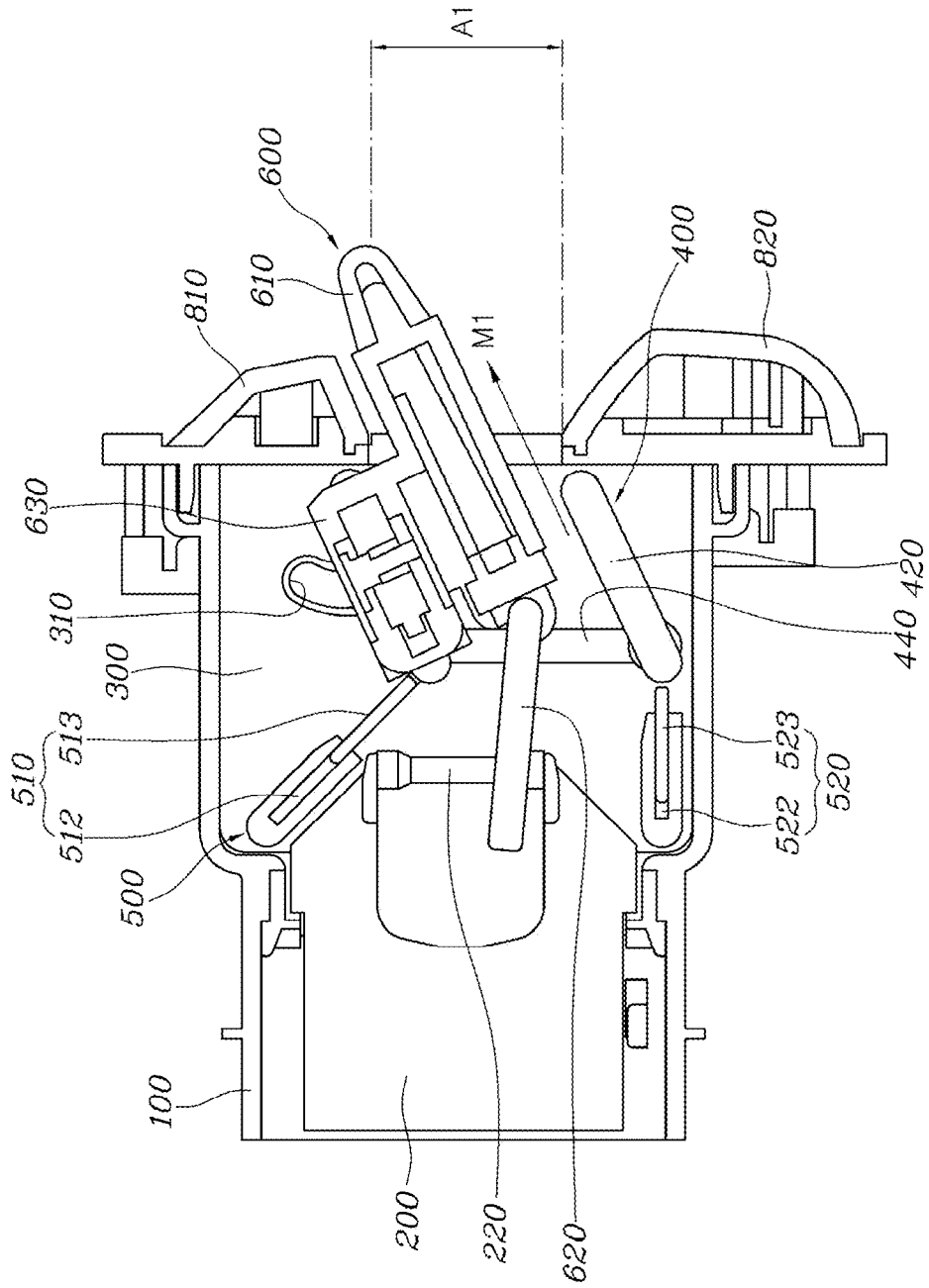
FIG. 5 and FIG. 6 are views exemplarily illustrating the state in which the knob and the external wings are rotated upwards and the state in which the knob and the external wings are rotated downwards.

When the upper external wing 410 and the lower external wing 420 are rotated upwards to the state shown in FIG. 5 from the state shown in FIG. 4 by moving the knob 600 upwards, the air that has passed through the front flow path 710 is discharged upwards through the rear flow path 720 (see arrow M1).

At the present time, the lug 610 of the knob 600 may come into contact with an upper garnish 810 coupled to the duct 100.

Figure 6:
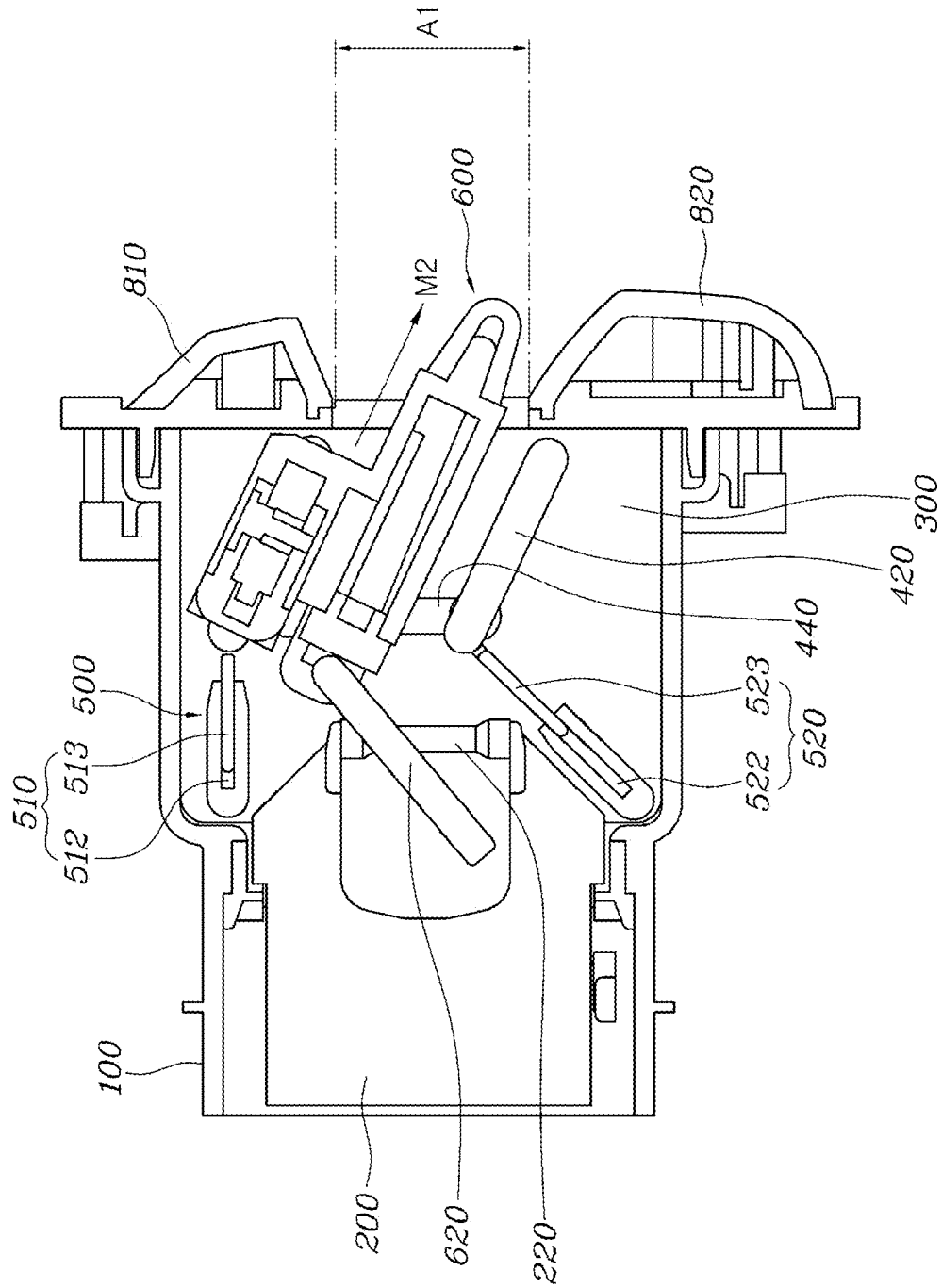

Meanwhile, when the upper external wing 410 and the lower external wing 420 are rotated downwards to the state shown in FIG. 6 from the state shown in FIG. 4 by moving the knob 600 downwards, the air that has passed through the front flow path 710 is discharged downwards through the rear flow path 720 (see arrow M2).

At the present time, the lug 610 of the knob 600 may come into contact with a lower garnish 820 coupled to the duct 100.

The exemplary embodiment of the present invention is characterized in that the cross-sectional area A1 of the rear flow path 720 is maintained at a certain size, regardless of upward rotation or downward rotation of the upper external wing 410 and the lower external wing 420. Accordingly, since the amount of air which is discharged to the passenger compartment is maintained constant, there is an advantage in that the performance of the air vent is improved.

In other words, there is a characteristic in which the cross-sectional area A1 of the rear end portion of the rear flow path 720, through which air is discharged to the passenger compartment, is maintained at a certain magnitude regardless of the rotation direction of the external wings 410.

Furthermore, when the upper external wing 410 and the lower external wing 420 are rotated upwards and downwards, the lengths of the upper support wing 510 and the lower support wing 520 vary independently.

When the upper external wing 410 and the lower external wing 420 are rotated upwards, the length of the upper support wing 510 is changed to increase. Meanwhile, when the upper external wing 410 and the lower external wing 420 are rotated downwards, the length of the lower support wing 520 is changed to increase.

To allow the lengths of the upper support wing 510 and the lower support wing 520 to vary, the upper support wing 510 and the lower support wing 520 include respectively cylinders 512 and 522 and cylinder rods 513 and 523, which are movably disposed in respective cylinders 512 and 522.

As is apparent from the above description, the slim air vent apparatus for a vehicle according to the exemplary embodiment of the present invention is constructed such that all of the internal wings 200, the external wings 400 and the support wings 500 are disposed inside the duct 100 while satisfying performance requirements for an air vent regarding wind direction, the amount of airflow, the directivity of airflow, noise, and airtightness. Accordingly, since the vertical height of the air vent is greatly reduced, there are advantages in that it is possible to realize a compact and slim air vent apparatus having a smart and luxurious appearance and in that the air vent is also configured for being applied to an autonomous vehicle having a tidy appearance.

Furthermore, since the slim air vent apparatus according to the exemplary embodiment of the present invention is constructed such that all of the internal wings 200, the external wings 400 and the support wings 400 are disposed inside the duct 100, there is an advantage in that it is possible to improve the appearance by hiding the components.

Furthermore, since the slim air vent apparatus according to the exemplary embodiment of the present invention is constructed such that the cross-sectional area of the rear flow path 720 is maintained at a certain magnitude regardless of vertical rotation direction of the upper external wings 410 and the lower external wings 420, there are advantages in that the amount of air which is discharged to the passenger compartment is always maintained constant, improving the performance of the air vent.

Furthermore, since the slim air vent apparatus according to the exemplary embodiment of the present invention is operated to fulfill the functions thereof by manual manipulation of only one knob 600, positioned at the center portion of the external wings 400, by a user, there are advantages in that it is possible to improve the convenience of manipulation by a user and to reduce manufacturing costs by manual manipulation of the knob 600, and in that the air vent is universally applicable to various kinds of vehicles.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A slim air vent apparatus for a vehicle, the slim air vent apparatus comprising:
    spacers fixedly coupled to first and second lateral sides of a duct;
    an internal wing disposed in the duct;
    an external wing positioned behind the internal wing, wherein first and second lateral end portions of the external wing are rotatably coupled to the spacers to be rotated in a predetermined direction;
    a support wing rotatably coupled to a front end portion of the external wing, wherein first and second lateral end portions of the support wing are rotatably coupled to the spacers so that a length of the support wing is changed when the external wing is rotated; and
    a knob coupling the internal wing to the external wing, wherein the internal wing, the external wing and the support wing are positioned inside the duct,
    wherein the knob includes:
        a first coupler coupled to a vertical rod of the internal wing to be movable in a vertical direction; and
        a second coupler coupled to the first coupler and to a portion of the external wing to be movable in a lateral direction,
    wherein at a rear end of the external wing, a wing groove is formed, in which the second coupler is inserted to restrict a range of lateral movement of the external wing, and
    wherein the second coupler is formed to completely enclose an outer periphery of the wing groove formed in the external wing.

2. The slim air vent apparatus of claim 1,
    wherein the external wing includes an upper external wing and a lower external wing, which are spaced from each other in the predetermined direction,
    wherein one of the upper external wing and the lower external wing includes a guide protrusion formed in at least a lateral side thereof, and
    wherein at least one of the spacers include a guide slot, which extends along a rotational radius of the external wing and the guide protrusion is movable engaged in the guide slot.

3. The slim air vent apparatus of claim 1, wherein the external wing includes an upper external wing and a lower external wing, which are spaced from each other in the predetermined direction and are pivotally connected to each other via a connecting rod to be rotated together.

4. The slim air vent apparatus of claim 3, wherein each of first and second lateral sides of a rear end portion of the upper external wing and first and second lateral sides of a rear end portion of the lower external wing is provided with hinge protrusions fitted into hinge holes formed in the spacers so that the upper external wing and the lower external wing are rotated relative to the spacers in the predetermined direction.

5. The slim air vent apparatus of claim 3, wherein the support wing includes:
    an upper support wing, which is rotatably connected to a front end portion of the upper external wing and which is provided at first and second lateral sides of a front portion thereof with a hinge protrusion, which are fitted into hinge holes formed in the spacers so that the upper support wing is rotated relative to the spacers in the predetermined direction; and
    a lower support wing, which is rotatably connected to a front end portion of the lower external wing and which is provided at first and second lateral sides of a front portion thereof with hinge protrusions, which are fitted into hinge holes formed in the spacers so that the lower support wing is rotated relative to the spacers in the predetermined direction.

6. The slim air vent apparatus of claim 5, wherein air that has passed through the internal wing in the duct is discharged to a passenger compartment through a front flow path defined between the upper support wing and the lower support wing and through a rear flow path defined between the upper external wing and the lower external wing.

7. The slim air vent apparatus of claim 5, wherein, when the knob is oriented horizontally, the upper external wing and the upper support wing, which are disposed above the knob, are positioned to be symmetrical to the lower external wing and the lower support wing, which are disposed below the knob.

8. The slim air vent apparatus of claim 6, wherein, when the knob is oriented horizontally, a cross-sectional area between the upper support wing and the lower support wing decreases moving toward rear end portions thereof from front end portions thereof so that the front flow path is configured as a nozzle.

9. The slim air vent apparatus of claim 6, wherein a cross-sectional area of the rear flow path is maintained at a predetermined magnitude regardless of a rotation direction of the upper external wing and the lower external wing.

10. The slim air vent apparatus of claim 6, wherein air that has passed through the front flow path is discharged upwards through the rear flow path when the external wing is rotated upwards, and is discharged downwards through the rear flow path when the upper external wing and the lower external wing are rotated downwards.

11. The slim air vent apparatus of claim 6, wherein each of the upper support wing and the lower support wing includes a cylinder and a cylinder rod is movably fitted into the cylinder so that lengths of the upper support wing and the lower support wing vary independently when the external wing is rotated in the predetermined direction.

12. The slim air vent apparatus of claim 6,
wherein the knob further includes a lug, which is configured to be manipulated by a user.

13. The slim air vent apparatus of claim 12,
wherein only a portion of the lug projects outwards from the duct to be exposed to the passenger compartment.

* * * * *